Dec. 17, 1963
T. A. RIANDA
3,114,403
SEED POTATO CUTTING APPARATUS
Filed June 28, 1962
3 Sheets-Sheet 1
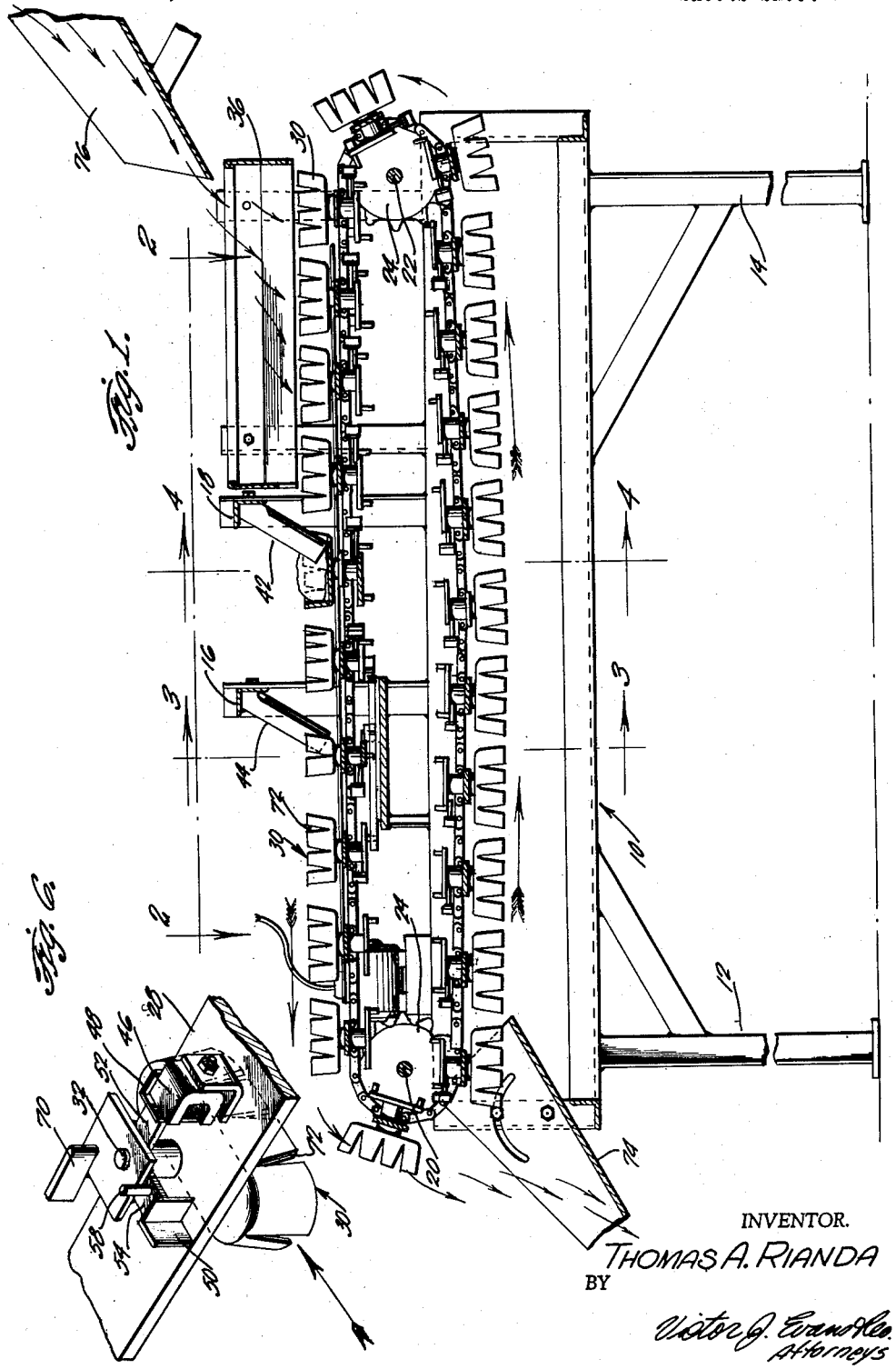
INVENTOR.
THOMAS A. RIANDA
BY
Victor J. Evans Co.
Attorneys Dec. 17, 1963 T. A. RIANDA 3,114,403
SEED POTATO CUTTING APPARATUS
Filed June 28, 1962 3 Sheets-Sheet 2
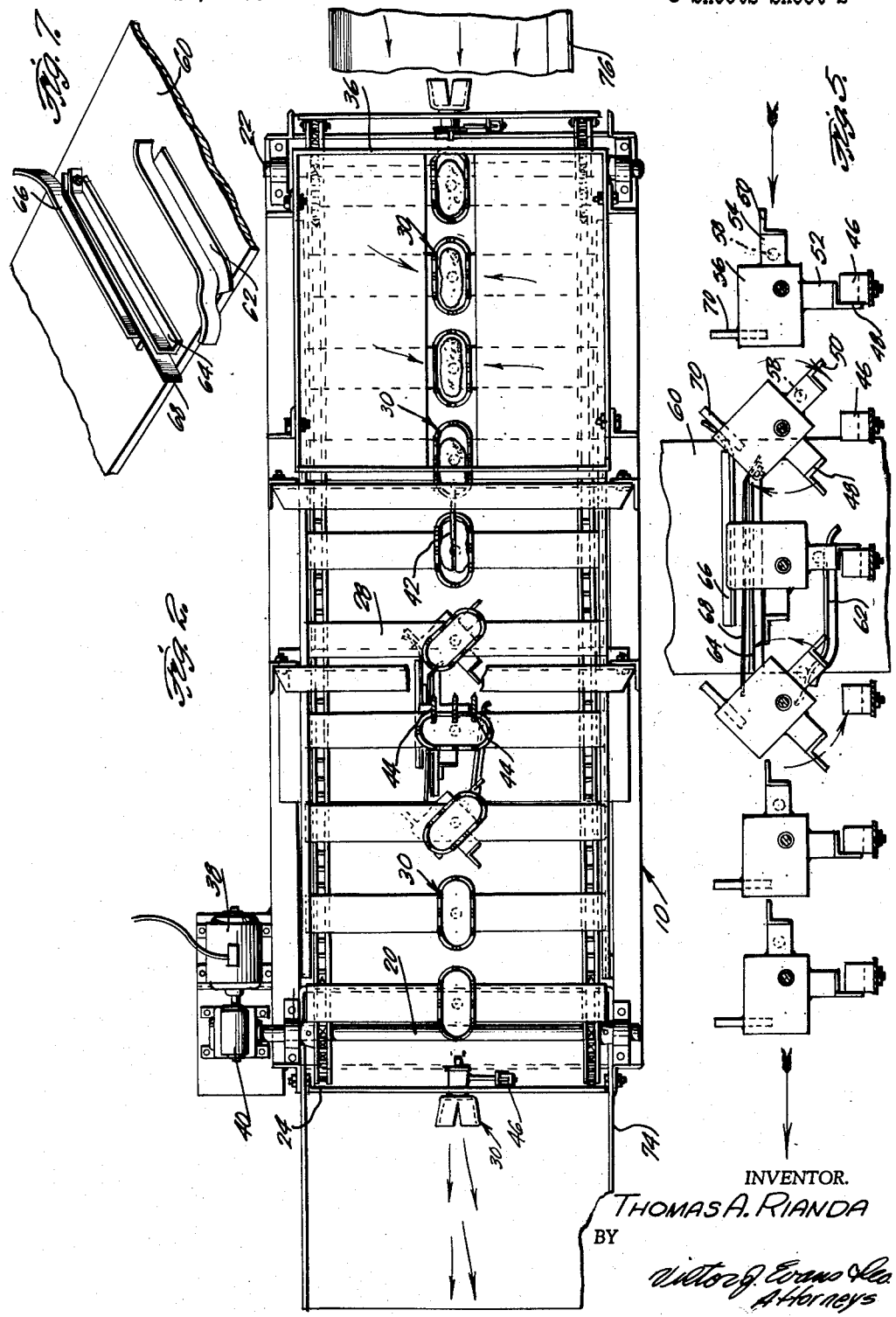
INVENTOR.
THOMAS A. RIANDA
BY
*Victor J. Evans & Co.*
*Attorneys*

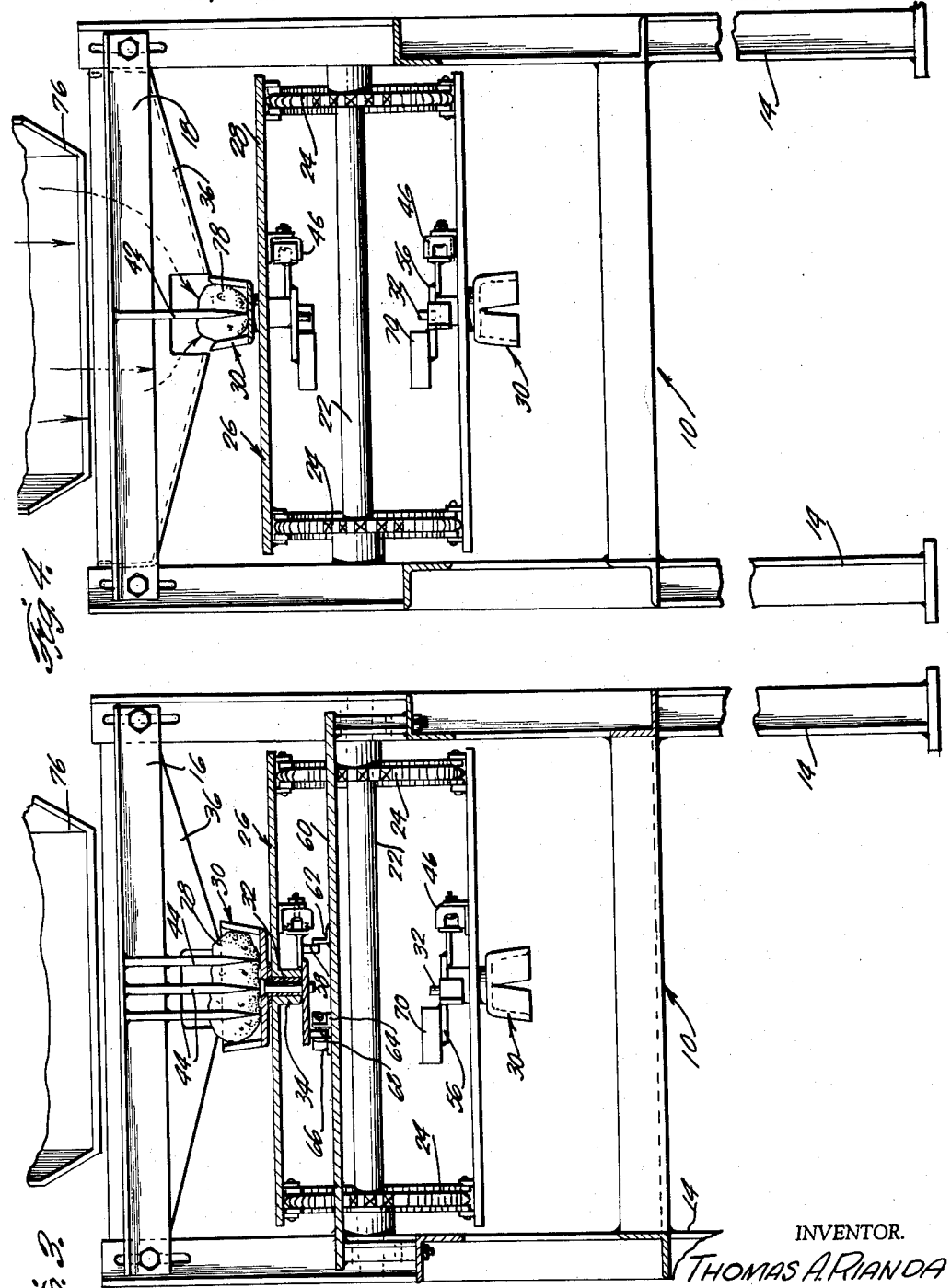

_United States Patent Office_

3,114,403
Patented Dec. 17, 1963

3,114,403
SEED POTATO CUTTING APPARATUS
Thomas A. Rianda, P.O. Box 39, Gonzales, Calif.
Filed June 28, 1962, Ser. No. 206,081
1 Claim. (Cl. 146—78)

The present invention relates to an apparatus for cutting seed potatoes.

An object of the present invention is to provide an apparatus for cutting seed potatoes which is foolproof in operation, one requiring little or no attention during its operation, one automatic in operation and one which is highly effective in action.

Another object of the present invention is to provide an apparatus for cutting seed potatoes which may be manufactured in quantity at reasonable cost, one which is readily assembled and disassembled for adjustment, and one which is economically feasible.

These and other objects and advantages of the present invention will be fully apparent from the following description when taken in connection with the annexed drawings, in which:

FIGURE 1 is an elevational view partly in section with one side removed of the apparatus according to the present invention, FIGURE 2 is a view taken on the line 2—2 of FIGURE 1, FIGURE 3 is a view taken on the line 3—3 of FIGURE 1 and on an enlarged scale, FIGURE 4 is a view on an enlarged scale taken on the line 4—4 of FIGURE 1, FIGURE 5 is a fragmentary view showing the mechanism for rotating the cup elements, FIGURE 6 is a perspective view of one of the cup elements, inverted and showing the mechanism for holding the cup element in each of two positions, and FIGURE 7 is a perspective view of the cooperating mechanism for rotating the cup elements.

Referring to the drawings in detail in which like numerals indicate like parts throughout the several views, the present invention comprises a frame 10 having legs 12 and 14 and overhead support members 16 and 18.

A rotatable shaft 20, disposed horizontally, is mounted at one end of the frame 10 and another shaft 22 is similarly mounted at the other end of the frame 10. Affixed to each shaft 20 and 22 are sprockets 24 forming part of the mechanism for an endless conveyor belt 26.

As shown most clearly in FIGURE 2, the belt 26 consists in a plurality of spaced slats 28 extending transversely of the conveyor 26 with each slat 28 carrying a cup element 30. Each element 30 is mounted upon the upper end of a short shaft 32 for rotation with the shaft 32.

Each shaft 32 is mounted in a bearing member 34 formed integrally with the adjacent slat 28. Supported above the conveyor belt 26 at one end of the frame 10 is a hopper 36 for delivering potatoes to each of the cup elements 30 in turn as the conveyor belt travels in the direction shown by the arrow in FIGURE 1.

A motor 38 with a speed reducer 40 is drivably connected to the shaft 20 as shown in FIGURE 2.

Means is provided for partially rotating each of the cup elements 30 in turn so that a potato carried thereon may be sliced in two different directions.

As shown in FIGURE 3, there are three knives 42 depending from the support member 16 and as shown in FIGURE 4, a single knife 44 depends from the support member 18. A means for rotating each of the cup elements 30 is disposed between the knives 42 and 44. This means includes a pair of L-shaped elements 48 and 50 projecting from the free ends of arms 52, 54, respectively, which are arranged at an angle of ninety degrees to each other and which project from the adjacent side edges of a plate 56 secured to the shaft 32. A magnet 46, having opposed parallel sides and a front face facing the adjacent shaft 32, is engaged on one side by one leg of and on the front face by the other leg of the one stop element 48 when the shaft 32 is in a first position and is engaged on the other side by one leg and on the front face by the other leg of the other stop element 50 when the shaft 32 has been rotated 90 degrees to a second position, as shown in FIGURE 5. The rotating means also includes a pin 58 projecting downwardly from the arm 54 as shown in dotted lines in FIGURE 5.

A support bar 60 extends across the conveyor belt 26 between the upper flight and lower flight thereof and carries a guide rail 62 which is engaged by the pin 58 of each cup element as the conveyor belt moves. This is shown most clearly in FIGURE 3.

Also carried by the bar 60 are a pair of spaced rails 64 and 66 with a spring 68 fastened at one end to one end of the rail 64. The space between the spring 68 and the rail 66 forms a guideway for a bar 70 depending from the plate 56 as shown in FIGURE 5. As shown most clearly in FIGURE 1 each of the cup elements 30 is provided in its wall with opposed slots 72 which permit the passage therethrough of the knives 42 and 44 to cut a potato when in the cup element 30.

Fastened to the frame 10 at one end thereof is an apron 74 for delivery of the cut potatoes as the same are dropped from each of the cup elements 30 in turn upon traveling movement of the conveyor belt 26. Over the end of the hopper 36 remote from the apron 74 is a delivery chute 76 for introducing whole potatoes into the hopper 36 for distribution into the cup elements 30. The apron 74 is adjustably connected to the frame 10 so as to permit flowing of the cut potatoes into a container of any height.

In use, potatoes are fed into the chute 76 and are delivered to the hopper 36 from where they enter the cup elements 30 in turn as the conveyor upper flight travels to the left in FIGURE 1. As the cup elements 30 pass onto the knife 42 the knife enters one of the slots in the end of the cup element 30, cuts the potato lengthwise, and exits out of the other slot as the cup element 30 passes. Upon reaching of the turning means, the bar 70 is engaged by the curved end portion of the rail 66 as shown in FIGURE 5 and the attraction of the magnet 46 to the stop element 48 is broken sufficiently that the shaft 32 is permitted to rotate a quarter of a turn to where the other stop element 50 engages the magnet 46. When the bar 70 is out of the guideway formed by the springs 68 and the rail 66, the pin 58 reaches the curved portion of the rail 62 and the shaft is rotated in the counter-clockwise direction to return the cup element 30 to the original position. This happens after the knives 44 have subdivided the split potato into eight pieces. The potato is shown in FIGURES 3 and 4, and is designated by the reference numeral 78.

It will be seen therefore that the apparatus of the present invention provides an automatic means for cutting a seed potato into the proper number of portions with a minimum of attention and without the use of hand labor.

While only a preferred embodiment of the present invention is shown and described other embodiments are contemplated and numerous changes and modifications may be made in the present invention without departing from the spirit thereof as set forth in the appended claim.

What is claimed is:

In an apparatus for severing an article into smaller pieces including a conveyor and a plurality of support elements arranged in tandem relation along the conveyor and each connected to said conveyor for rotary movement between first and second positions for successively cutting a supported article in first one direction and then in another direction by passage of said support element beneath tandemly arranged first and second blades, means for rotating each of said support elements in turn from the first position to the second position after passing the first blade and means for rotating each of said element in turn from the second position to the first position after passing the second blade, the improvement consisting in providing a releasable holding means for holding each of said support elements in each of its first and second positions, said means comprising a magnet carried by said conveyor and disposed adjacent to and spaced from each of said support elements, each of said magnets having opposed parallel sides arranged transversely of said conveyor, and a front face facing the adjacent support element, a first magneticaly attractive L-shaped stop element disposed radially outwardly of each of said support elements and secured to the adjacent support element for rotation therewith, a second magnetically L-shaped stop element similarly disposed with respect to said support element as said first stop element but at an angle of ninety degrees relative to said first stop element, said first stop element having one of its legs releasably engaged with one of the opposed sides of said magnet and having the other of its legs engaged with said front face of said magnet when said support element is in the first position and said second stop element having one of its legs releasably engaged with the other of the opposed sides of said magnet and having the other of its legs engaged with said front face of said magnet when said support element is in the second position.

References Cited in the file of this patent

UNITED STATES PATENTS

| | | |
|---|---|---|
| 1,193,437 | Small | Aug. 1, 1916 |
| 1,260,555 | Lawrence | Mar. 26, 1918 |
| 1,357,241 | McGee | Nov. 2, 1920 |